(12) United States Patent
Wäller et al.

(10) Patent No.: US 9,589,392 B2
(45) Date of Patent: Mar. 7, 2017

(54) METHOD AND SYSTEM FOR PROVIDING A USER INTERFACE IN A VEHICLE

(75) Inventors: Christoph Wäller, Braunschweig (DE); Maria Esther Mejia Gonzalez, Braunschweig (DE); Lennart Bendewald, Wolfsburg (DE); Stefan Henze, Braunschweig (DE)

(73) Assignees: AUDI AG, Ingolstadt (DE); VOLKSWAGEN AG, Wolfsburg (DE)

( * ) Notice: Subject to any disclaimer, the term of this patent is extended or adjusted under 35 U.S.C. 154(b) by 140 days.

(21) Appl. No.: 14/118,126

(22) PCT Filed: Apr. 30, 2012

(86) PCT No.: PCT/EP2012/001868
§ 371 (c)(1),
(2), (4) Date: Nov. 15, 2013

(87) PCT Pub. No.: WO2012/156029
PCT Pub. Date: Nov. 22, 2012

(65) Prior Publication Data
US 2014/0095000 A1    Apr. 3, 2014

(30) Foreign Application Priority Data

May 17, 2011   (DE) .......................... 10 2011 101 808

(51) Int. Cl.
*G07C 5/08* (2006.01)
*G07C 5/00* (2006.01)
(Continued)

(52) U.S. Cl.
CPC .............. *G07C 5/008* (2013.01); *B60K 35/00* (2013.01); *B60K 37/06* (2013.01);
(Continued)

(58) Field of Classification Search
CPC ...... B60K 2350/1068; B60K 2350/357; B60K 2350/405; B60K 2350/903; B60K 37/06; G06F 3/1454; G07C 5/008
See application file for complete search history.

(56) References Cited

U.S. PATENT DOCUMENTS 9,064,101 B2 *   6/2015   Kleve ................... H04L 9/3215
9,073,568 B2 *   7/2015   Krauss .................. B60K 35/00
(Continued)

FOREIGN PATENT DOCUMENTS

CN         101681232 A        3/2010
CN         101808854 A        8/2010
(Continued)

OTHER PUBLICATIONS

Search Report for German Patent Application No. 10 2011 101 808.9; Dec. 28, 2011.
(Continued)

*Primary Examiner* — Jerrah Edwards
*Assistant Examiner* — Donald J Wallace
(74) *Attorney, Agent, or Firm* — Barnes & Thornburg LLP

(57) ABSTRACT

A method and system for providing a user interface in a vehicle, wherein a wireless data link is formed between the vehicle and a mobile playback device which is releasably connected in the vehicle or is held freely by a user. Operating parameters relevant for the operation of the vehicle are detected on the vehicle and information relating to detected operating parameters is displayed by a display and control unit installed in the vehicle and which can be read from the driver's seat position. A wireless data link is formed between the vehicle and a mobile playback device which is releasably connected in the vehicle or is held freely by a user. Data for generating display content are transmitted via the wireless (Continued)

data link from the vehicle to the playback device, and on the basis of the transmitted data display content is generated on the playback device.

16 Claims, 4 Drawing Sheets

(51) Int. Cl.
    *B60K 35/00*     (2006.01)
    *B60K 37/06*     (2006.01)

(52) U.S. Cl.
    CPC   *B60K 2350/1068* (2013.01); *B60K 2350/355* (2013.01); *B60K 2350/405* (2013.01)

(56) References Cited

U.S. PATENT DOCUMENTS

| | | | | |
|---|---|---|---|---|
| 9,195,633 | B2* | 11/2015 | Enami | B60K 37/06 |
| 9,326,089 | B2* | 4/2016 | Xia | B60K 35/00 |
| 2004/0172182 | A1 | 9/2004 | Pathare | |
| 2006/0155431 | A1 | 7/2006 | Berg et al. | |
| 2008/0103612 | A1 | 5/2008 | Bergmann et al. | |
| 2009/0119720 | A1* | 5/2009 | Deuel | G01C 21/26 725/75 |
| 2010/0124005 | A1 | 5/2010 | Hotary et al. | |
| 2011/0166748 | A1* | 7/2011 | Schneider | B60K 35/00 701/36 |
| 2012/0086247 | A1* | 4/2012 | Liu | 297/217.3 |

FOREIGN PATENT DOCUMENTS

| | | |
|---|---|---|
| DE | 10308897 A1 | 10/2004 |
| DE | 102004027642 A1 | 1/2006 |
| DE | 102005058113 A1 | 6/2006 |
| DE | 102005038969 A1 | 8/2006 |
| DE | 102006060514 A1 | 6/2008 |
| DE | 102009019818 A1 | 3/2010 |
| EP | 0807878 A1 | 11/1997 |
| EP | 2098137 A1 | 9/2009 |
| EP | 1809511 B1 | 4/2010 |
| JP | 2007046395 A | 2/2007 |
| WO | 2006125515 A1 | 11/2006 |
| WO | 2008091727 A1 | 7/2008 |
| WO | WO 2009073806 A2 * 6/2009 ............. G01C 21/36 |

OTHER PUBLICATIONS

Search Report for International Patent Application No. PCT/EP2012/001868; Oct. 12, 2012.
Office Action for Korean Patent Application No. 10-2013-7031040; Oct. 23, 2014.
Search Report for Chinese Patent Application No. 2012800330778; Jul. 20, 2015.

* cited by examiner

METHOD AND SYSTEM FOR PROVIDING A USER INTERFACE IN A VEHICLE

PRIORITY CLAIM

This patent application is a U.S. National Phase of International Patent Application No. PCT/EP2012/001868, filed 30 Apr. 2012, which claims priority to German Patent Application No. 10 2011 101 808.9, filed 17 May 2011, the disclosures of which are incorporated herein by reference in their entirety.

SUMMARY

The present disclosure relates to a method and a system for providing a user interface in a vehicle, in which a wireless data link is set up between the vehicle and a mobile reproduction appliance that is detachably connected in the vehicle or that is freely held by a user in the vehicle.

BRIEF DESCRIPTION OF THE DRAWINGS

The invention will now be explained in more detail using illustrative embodiments with reference to the figures.

DETAILED DESCRIPTION OF THE DISCLOSED EMBODIMENTS

Figure 1:
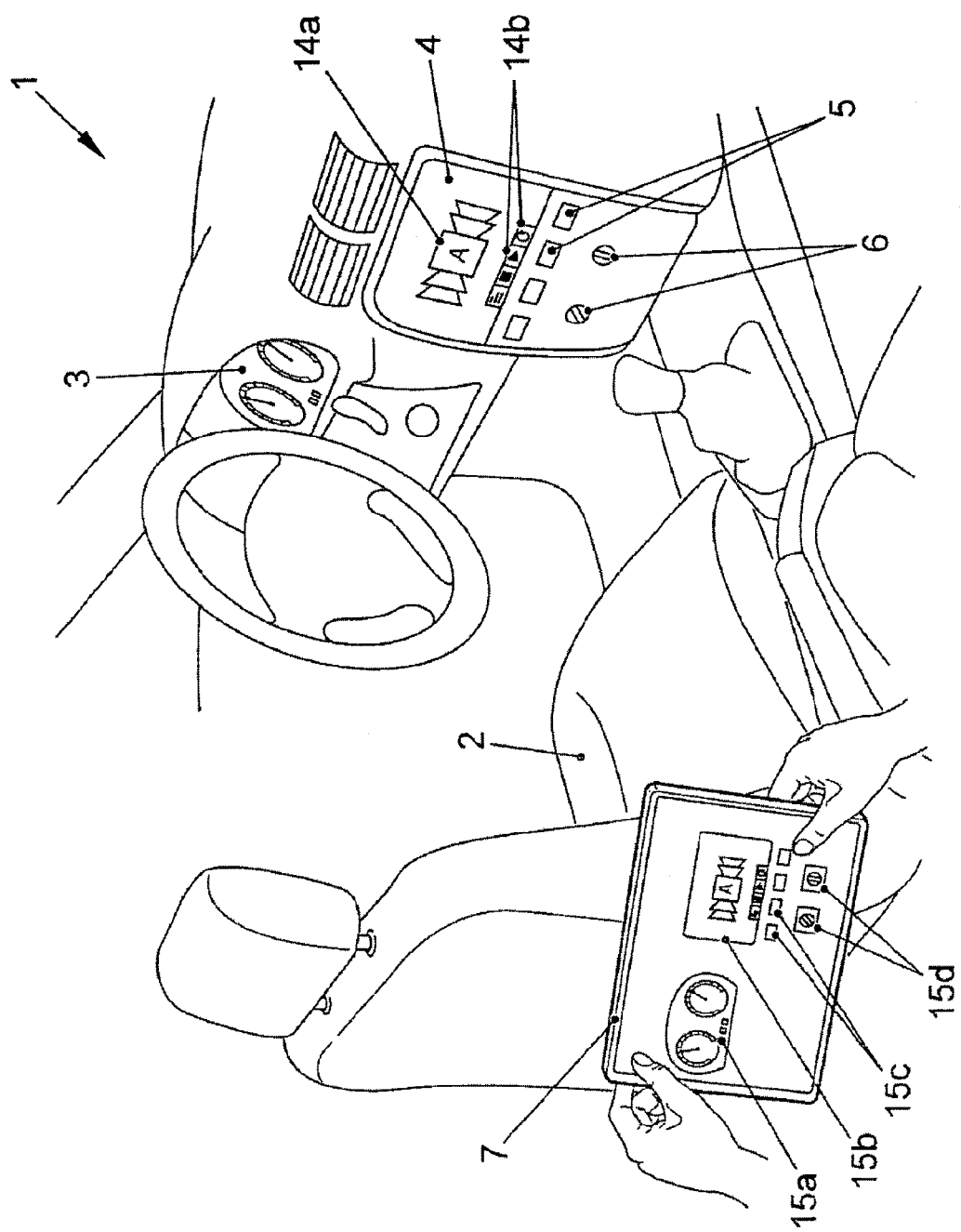
FIG. 1 shows a view of a passenger compartment in a vehicle with a system for providing a user interface.

Illustrative embodiments specify a method and a system for providing a user interface for a mobile reproduction appliance that is detachably connected in the vehicle or that is freely held by a user in the vehicle. In this case, the aim is to allow flexible operator control that is atuned to the respective use situation.

Illustrative embodiments provide a user interface in a vehicle involves operating parameters that are relevant to the operation of the vehicle being captured at the vehicle and a display and operator control device that is arranged permanently in the vehicle and that can be read from the seat position of the driver being used to display information about captured operating parameters. A wireless data link is set up between the vehicle and a mobile reproduction appliance that is detachably connected in the vehicle or that is freely held by a user in the vehicle, data for producing a display content are transmitted from the vehicle to the reproduction appliance via the wireless data link, and the transmitted data are taken as a basis for producing a display content on the reproduction appliance, which display content comprises information about captured operating parameters that is displayed on the display and operator control device. This allows the data that are relevant to the operation of the vehicle, particularly a view of the cockpit of the vehicle, to be displayed at any location in the vehicle and on mobile reproduction appliances that have been brought along.

Operating parameters for the vehicle are currently arising data in the vehicle that are associated with the operation and movement of the vehicle. They comprise particularly the vehicle speed, the engine speed, information concerning gear position, refueling and consumption information and information concerning the vehicle air-conditioning system. They may also comprise driver assistance data that are captured at the vehicle. Such operating parameters are typically displayed in real time. The capture of these operating parameters at the vehicle is effected using capture devices that are permanently associated with the vehicle and that are installed permanently in the vehicle, e.g. a speedometer cable or various operating sensors. The information displayed on the display and operator control device can provide further display contents besides the display of the operating parameters, e.g. output contents from an infotainment device such as a graphical user menu for controlling the radio, for example.

A mobile reproduction appliance for this that is suitable for this purpose may be a laptop computer, for example, particularly a computer with a touch-sensitive user interface, which are also known as "tablet PCs". Alternatively, other reproduction appliances, particularly with a user programmable display panel or with a touch screen, such as DVD players or similar media players, can be used. A further advantage is therefore that the rapid technological advancement in display technology allows benefit to be drawn from the relatively short market cycles in consumer electronics in comparison with the market cycles in vehicle construction. It is thus possible to dispense with upgrading the display panels that are provided permanently in the vehicle in the medium and long terms if need be.

The wireless data link can be made using inherently known techniques, particularly using short-range radio technologies, such as by WLAN (Wireless Local Area Network) or by Bluetooth, or alternatively using an infrared interface.

In illustrative embodiments of the method, a subregion of the display content that the information displayed on the display and operator control device comprises is selected on the reproduction appliance, and the selected subregion of the display content is presented in highlighted form and/or in enlarged form. This allows the vehicle occupant to focus on a subregion of the cockpit view from any position in the vehicle at which he is currently holding the mobile reproduction appliance or has detachably mounted it. The focus does not need to be directed at that portion of the cockpit view that also displays the operating parameters. By way of example, the vehicle occupant might wish to focus his sight on the user menu for controlling the radio.

In illustrative embodiments of the method, at least some of the operator control elements that can be controlled from the seat position of the driver and/or function displays that can be read from the seat position of the driver are reproduced on the reproduction appliance, wherein mechanical analog function displays and/or mechanical operator control elements are presented by symbols. Any vehicle occupant can therefore have a realistic cockpit view presented on a reproduction appliance that has been brought along, the presentation not remaining limited to display contents that are already displayed in the vehicle in digitized form.

In illustrative embodiments of the method, an operator control element that is reproduced on the reproduction appliance is used to control a vehicle function. This allows any vehicle occupant to use the mobile reproduction appliances as a virtual cockpit and, by way of example, also to control a vehicle device from a position that could otherwise be controlled only using operator control elements in the cockpit or using other permanently installed operator control elements in the vehicle. This produces a high level of flexibility, because the operator control conception of the vehicle does not require prior definition of what vehicle function needs to be made available for operator control from where. This is advantageous for the operator control of comfort functions, for example, particularly for adjusting the seats and the air-conditioning system, or for controlling the occupant entertainment, e.g. in order to alter the volume of an audio output. In this case, provision may be made for the operator control of an operator control element that is reproduced on the reproduction appliance to alter the display content of the display and operator control device. Overall, the mobile reproduction appliance that has been brought along can be used as a remote control for controlling the vehicle functions. Those vehicle functions for which operator control needs to be reserved for the driver, for example, can still be disabled as appropriate by software.

Provision may be made for the operator control of an operator control element that is reproduced on the reproduction appliance to transmit an announcement to the driver of the vehicle. This announcement is output on the display and operator control unit in the cockpit, for example, the announcement possibly being a recommendation that the driver needs to confirm as appropriate. This allows an interaction mode to be made available that the vehicle occupants can use to communicate with the driver. In this case, the available vehicle functions may be classified into three categories, for example: a) functions that can be controlled freely by the occupants using reproduction appliances that have been brought along, b) functions that, although the occupants can preselect, require confirmation from the driver in order to initiate them, and c) functions for which operator control is reserved for the driver.

In illustrative embodiments of the method, the reproduction appliance can be used to display moving pictures that are captured at the vehicle and that are recorded from the vehicle. These can be better presented on appliances that have been brought along when the appliances have a relatively large surface area or have relatively high-quality display technology. In this case, provision may be made for the moving pictures to be overlaid with pictures that comprise driver assistance information or picture improvement means, e.g. braking distance entries and contrast editing. In addition, for entertainment purposes, particularly for children in the rear seats of the vehicle, provision may be made for the moving pictures to be overlaid with pictures that comprise passenger information, such as tourist information, or objects that can be used for realistic games associated with the moving pictures. By way of example, as an idea for a game, virtually inserted collision objects in a realistic camera setting for what is in front of the vehicle have to be removed by tapping on them.

In addition, provision may be made for media files to be output by the reproduction appliance using the vehicle information infrastructure. By way of example, a music track that is stored on a DVD player that has been brought along can be output via the vehicle loudspeakers.

Illustrative embodiments provide a user interface in a vehicle comprises a capture device that is permanently arranged in the vehicle and that can be used to capture operating parameters that are relevant to the operation of the vehicle at the vehicle, a display and operator control device that is arranged permanently in the vehicle, that can be read from the seat position of the driver and that can be used to display information, particularly information about captured operating parameters, and a mobile reproduction appliance that is connected detachably to the vehicle or that is freely held by a user in the vehicle. The system comprises a wireless data interface between the reproduction appliance and the vehicle that can be used to transmit data for producing a display content from the vehicle to the reproduction appliance, and a control unit that is connected to the capture device, the display and operator control device and the data interface. The system is characterized in that the control unit can be used to take the transmitted data as a basis for producing a display content on the reproduction appliance, which display content comprises information about captured operating parameters that is displayed on the display and operator control device. The system is designed particularly for carrying out the method. It therefore also has the cited advantages.

In this case, the reproduction appliance may be mounted detachably in the vehicle, as a result of which the display content is reproduced at a position in the vehicle that cannot be viewed from the seat position of the driver, particularly on one of the rear seats of the vehicle.

In illustrative embodiments, the reproduction appliance is mounted detachably in the vehicle and the reproduction appliance can be controlled using an operator control element associated with the vehicle, particularly a touch-sensitive operator control panel. This means that it may be sufficient to provide each seat with a universal operator control element that is used to make a user interface matching the situation available on the reproduction appliance that has been brought along by virtue of the information presented flexibly according to the use situation. By way of example, user menus or buttons are displayed at positions on the reproduction appliance that are able to be controlled by touching a touch pad at the positions of the touch pad that are associated with these positions. This simplifies the design of the operator control system in the vehicle, reduces the number of variants if need be and therefore helps to lower costs.

Provision may be made for the reproduction appliance to be mounted detachably in the vehicle at a position that is associated with a particular seat position, and for the reproduction appliance to be controlled using an operator control element that is associated with the seat position and that is installed permanently in the vehicle. This allows individualization of the display content on the reproduction appliance. Depending on the seat position, the selectable and/or controllable display content is stipulated differently, for example.

By way of example, the reproduction appliance is detachably mounted in the vehicle by latching it in an appropriate bracket provided for the purpose, the latching being able to be captured by a sensor and the change of operator control mode being initiated as a result. In this case, the data link can continue to be made wirelessly, but it is also possible for there to be a change from the wireless link to a wired link if the bracket provided contains an appropriate interface.

In illustrative embodiments, a vehicle is equipped with such a system, with all system prerequisites that relate to the vehicle being fulfilled and a data interface being furnished to set up the wireless data link to the mobile reproduction appliance. A vehicle in this manner may comprise brackets suited particularly for mobile reproduction appliances.

FIG. 1 shows a view of a passenger compartment in a vehicle 1 with a system for providing a user interface according to illustrative embodiments. The system comprises a combination display with round instruments 3 for presenting operating parameters for the vehicle 1, a multifunction display 4 for presenting various information, for example output contents 14a, 14b from various functional devices in the vehicle 1, and various mechanical pushbutton switches 5 and rotary switches 6. The pushbutton switches 5 and the rotary switches 6 may themselves comprise context-specific displays. By way of example, they can be backlit in various colors depending on the operating situation in order to provide the driver with visual assistance in the operator control actions. The display and operator control elements can easily be read and controlled from the driver's seat 2 and are subsequently also referred to as the "cockpit" view.

The operating parameters that can be presented in the round instruments 3 typically comprise the speed and the engine speed in this case. In or below the round instruments 3 there may be further displays provided, from which it is possible to read the average consumption or the remaining range, for example. The driver can, by way of example, use a cyclic switch on a lever on the steering wheel to cyclically change through a plurality of such operating parameters (not shown).

The multifunction display 4 is preferably in the form of a touchscreen, which means that control is possible directly using buttons 14b presented on the multifunction display 4. Alternatively or else additionally, the multifunction display 4 may have associated pushbutton switches 5 that are used to control the permanently associated functions or context-specifically stipulated functions that are displayed on the multifunction display 4 (what is known as a soft key function). Particularly output contents 14a from a navigation appliance, an infotainment device or the comfort devices in the vehicle 1, e.g. the air-conditioning system, can be presented.

The rotary switches 6 are provided for the purpose of adjusting comfort functions in the vehicle 1, for example. They can be used to alter the temperature or fan strength of the air-conditioning system in the vehicle 1, for example.

Furthermore, the system comprises a mobile reproduction appliance 7 that has been brought along by a user, in this case what is known as a tablet PC with a touchscreen, which is held freely in the vehicle 1 or can be detachably connected to the vehicle 1 selectively. In illustrative embodiments, data can be transmitted from the vehicle 1 to the tablet PC 7 and, on the basis of the data, display contents 15a-15l can be displayed on the tablet PC as will now be explained in more detail using the basic design of illustrative embodiments of the system with reference to FIG. 2 and using illustrative embodiments of the method with reference to FIGS. 3a-3e.

Figure 2:
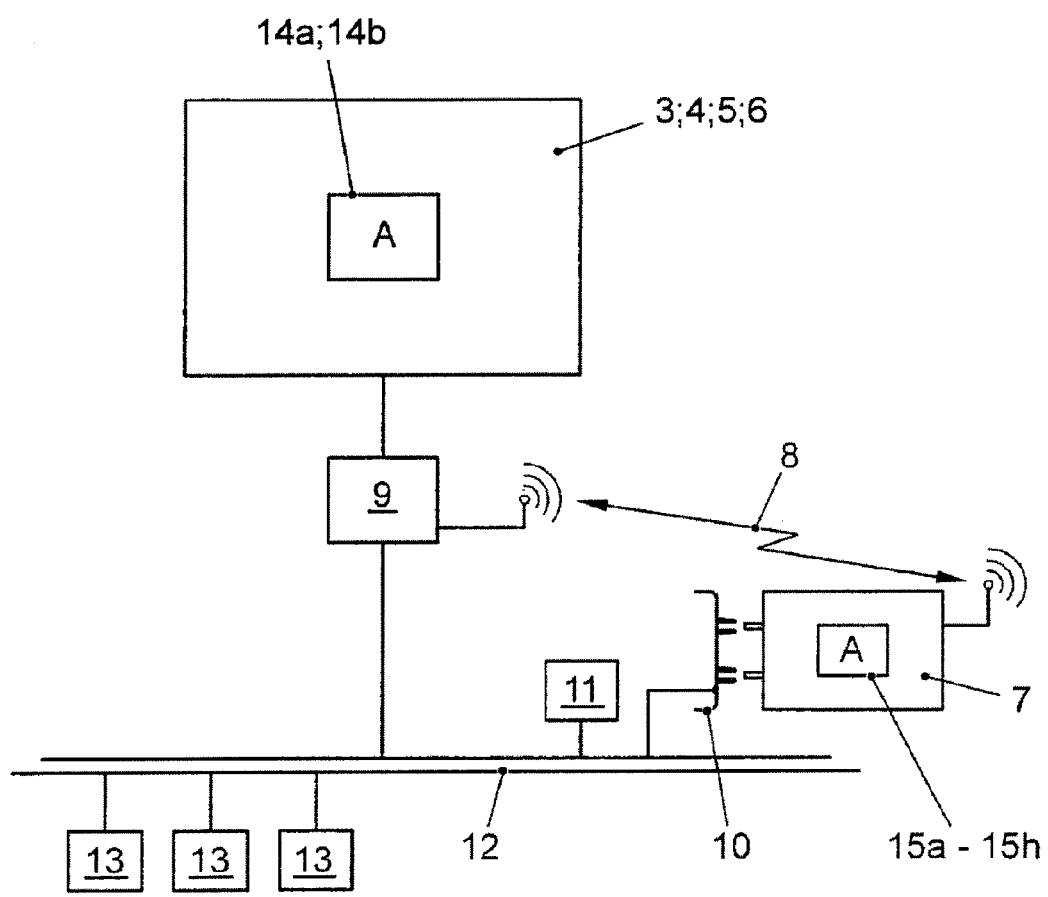
FIG. 2 schematically shows the basic design of a system for providing a user interface.

FIG. 2 schematically shows the basic design of a system for providing a user interface on the basis of illustrative embodiments. A display and operator control device 3, 4, 5, 6, for example the display and operator control device 3, 4, 5, 6 shown in FIG. 1, is connected to a control unit 9. In addition, the control unit 9 is connected via the data bus 12 in the vehicle 1 to a series of operating parameter sensors 13 that can be used to capture operating parameters that are relevant to the operation of the vehicle 1 at the vehicle, as a result of which the operating parameters can be displayed on the display and operating control device 3, 4, 5, 6.

In addition, the control unit 9 is connected to a radio interface 8 that can be used to set up a radio link between the vehicle 1 and a mobile reproduction appliance 7 that has been brought along, e.g. a tablet PC. By way of example, the tablet PC 7 is automatically captured upon entering the passenger compartment, and the link is automatically set up. Alternatively, the link can also be activated manually from the tablet PC 7. In this case, control data can be interchanged bidirectionally between the control unit 9 and the tablet PC 7. The control of the display contents 15a-15l on the tablet PC 7 and possibly the control of vehicle functions using the operator control elements 15c-15f that are reproduced on the tablet PC 7 are described in more detail further below in connection with the method.

In this case, the tablet PC 7 can be held freely or can be mounted in a bracket 10 provided for the purpose. A plurality of such brackets 10 may be provided, for example one per seat position. When mounted in the bracket 10, the tablet PC can be assigned a seat position in the vehicle, and a touch pad 11 associated with the respective seat can be activated, which the user can then use to make further inputs. When the tablet PC 7 is mounted in the bracket 10, contacts are closed, for example, which emit a control signal to the control unit 9. In this case, the radio link that has been set up beforehand via the radio interface 8 can be changed to a wired connection if need be by virtue of the control signals being sent between the control unit 9 and the tablet PC 7 via the data bus 12 of the vehicle 1. However, the data communication between vehicle 1 and tablet PC 7 can continue to take place via the radio interface 8.

The method will now be described using illustrative embodiments with reference to FIGS. 3a-3e. This can be done using the systems described with reference to FIGS. 1 and 2.

Figure 3A:
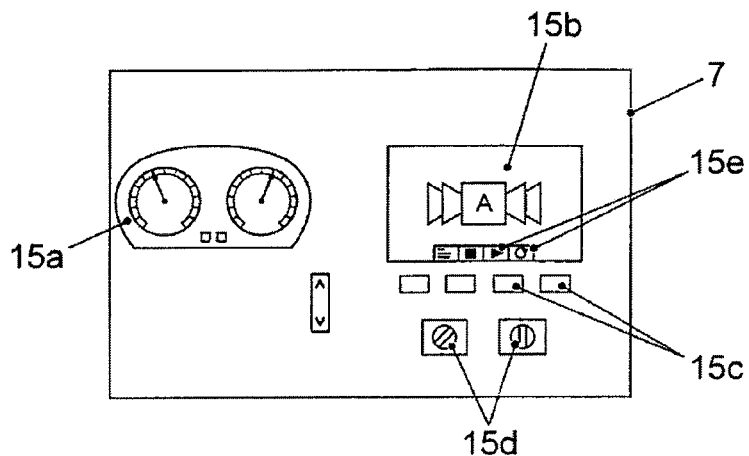
FIGS. 3a-3e show display contents on a reproduction appliance that has been brought along in the vehicle, the display contents having been produced according to illustrative embodiments of the method.

FIG. 3a shows a display content 15a-15e on the tablet PC 7 that has been brought along in the vehicle 1, the display content having been produced on the basis of illustrative embodiments of the method. Following capture of the tablet PC 7 in the vehicle 1, a data link is set up via the radio interface 8, and the cockpit view of the display and operator control device 3, 4, 5, 6 is presented on the tablet PC 7. In this case, the presentation of the operating parameters is continually updated on the basis of the values captured by the operating parameter sensors 13. The mechanical combination display of the round instruments 3 is presented as display content 15a and the digital output contents 14a of the multifunction display 4 are presented as display content 15b. The mechanical pushbutton switches 5 and the rotary switches 6 are presented as display contents 15c and 15d. The buttons 14b presented on the multifunction display 4 are presented as output contents 15e.

While the user is holding the tablet PC freely, operator control is possible via the touchscreen of the tablet PC 7 by virtue of the user selecting the relevant display contents by means of inherently known operator control gestures or initiating functions associated therewith. The user is normally not the driver of the vehicle. By way of example, it is a passenger on one of the rear seats of the vehicle 1. The tablet PC 7 provides him with the opportunity to use the display and operator control device from the back of the vehicle 1 as well.

Figure 3B:
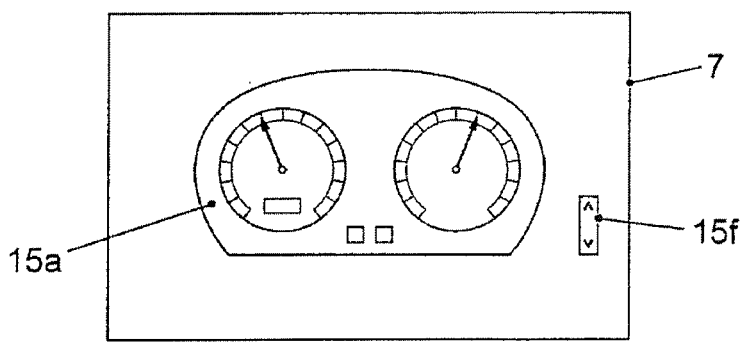

By way of example, the user selects the display content 15a by tapping on an appropriate area of the tablet PC 7, whereupon this portion of the cockpit view is presented in enlarged form, as shown in FIG. 3b. He can also be presented with a greater depth of detail than previously. By way of example, he is presented with a graphical representation of the cyclic selector lever for changing through a combined consumption and range presentation (not shown in FIGS. 1 and 2) as a controllable button 15f. Thus, the user could read the remaining range and other operating parameters that can be read in this manner, for example, without having to distract the driver of the vehicle 1 in the process. Using a suitable button (not shown) the user can get back to the presentation shown in FIG. 3a.

Figure 3C:
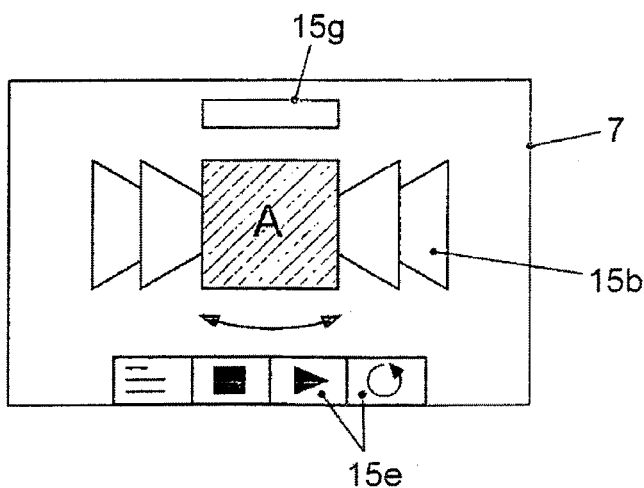

Alternatively, the user now selects the display content 15b, whereupon he is presented with an enlarged presentation of the display content 14a from the multifunction display 4, as shown in FIG. 3c. In this case, he is presented with the display contents as buttons again. In this case too, further display panels 15g can be displayed to him, which can be used to display more in-depth details regarding the display content 15b. In the case shown, the display contents 14a, 15b belong to an infotainment application, e.g. the list of music tracks to be played back. Both display contents 14a, 15b are synchronized. Thus, if either the user uses the tablet PC 7 or the driver or front-seat passenger uses the multifunction display 4 to select a music track, then a change in one of the display contents 14a, 15b would also involve an alteration in the correspondingly other display content.

For various vehicle functions, it may be less desirable for any user to alter global vehicle functions. The global vehicle functions include the display contents 14a, 14b for the multifunction display 4, but also general air-conditioning settings for the vehicle 1, for example. Particularly in the case of larger vehicles, e.g. in the case of small buses, this could result in confusing operator control situations. Therefore, provision may be made for such vehicles and/or for certain functions to first of all involve a message for the driver being output on the multifunction display 4 that needs to be confirmed by the driver or front-seat passenger (not shown).

Figure 3D:
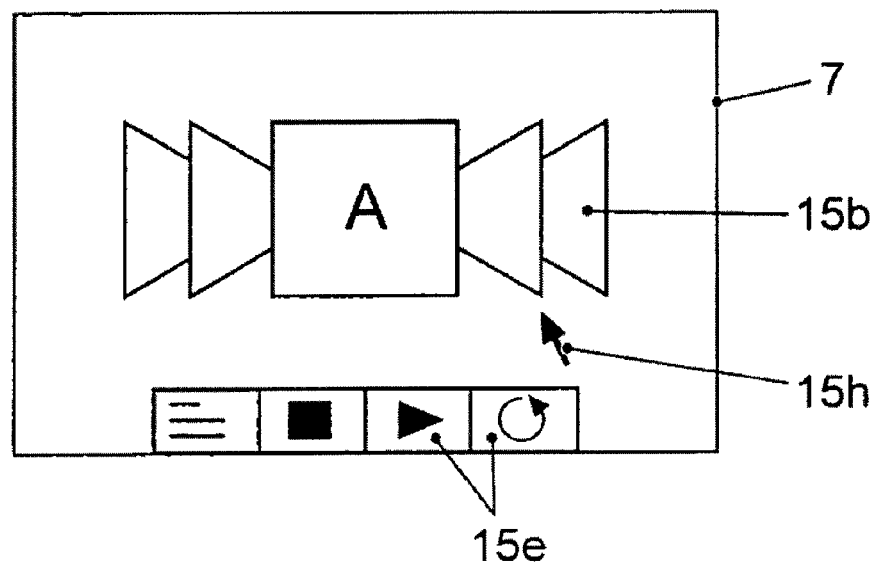

For more convenient operator control, the user can insert the tablet PC 7 into a bracket 10 associated with his seat. In this case, the display in FIG. 3d is altered in comparison with the display in FIG. 3c such that the buttons 15e are deactivated and there is a change to a different mode of operation. In this case, the operator control via the touchscreen is switched off completely and instead operator control via a touch pad 11 associated with the respective seat is made possible, the touch pad being arranged next to the respective seat in the arm rests or in a side door, for example. To this end, the user can have a cursor or a mouse pointer 15h displayed, the position of which on the tablet PC can be controlled using the touch pad 11. The control of the display contents and the initiation of the vehicle function can now be effected in a similar manner using the touch pad 11 and the displayed mouse pointer 15h. If no user control via the touch pad 11 occurs for a defined period of time, the mouse pointer 15h can be hidden completely and displayed again only for a fresh operator control action.

Figure 3E:
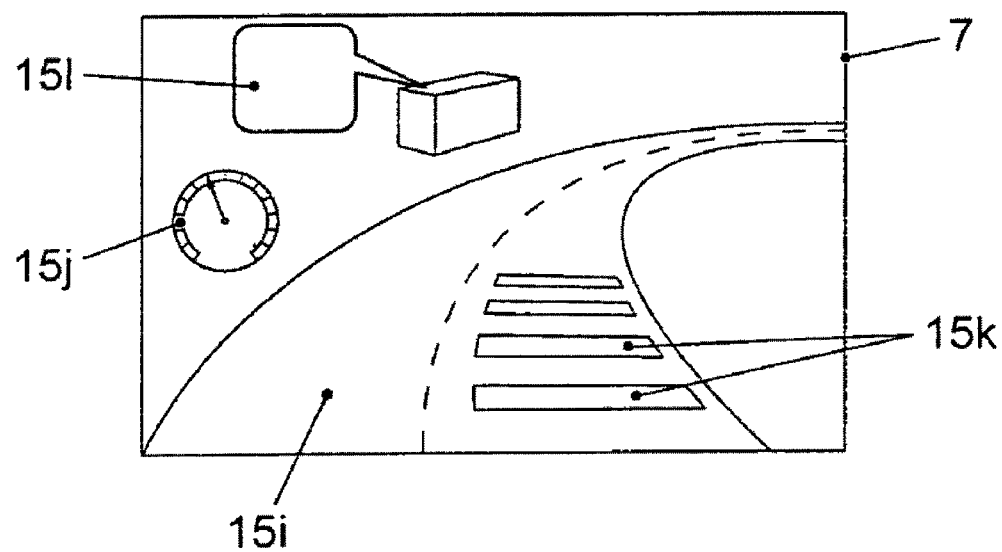

In further modes of operation, the user has the opportunity to present pictures from a forwardly directed camera on the tablet PC 7, for example, as shown in FIG. 3e. In this case, the picture displayed can be graphically edited and improved for the user by virtue of the road marking 15i, a visualized braking distance 15k or information about special destinations 15l being projected for him into the picture captured by the camera. In addition, it is also possible for visualization of important operating parameters, such as the display of a tachometer clock 15j, to be displayed to him in this case, for example.

In yet another mode of operation, the user has the opportunity to output media contents stored on the tablet PC 7 via the output appliances that are available in the vehicle. By way of example, it would thus be possible to output a music file via the vehicle loudspeaker and a video clip via the multifunction display 4 (not shown).

It is known practice to mount portable or mobile electronic appliances detachably in a vehicle and to couple them to other devices in the vehicle. By way of example, handsfree devices for mobile telephones are known in which the mobile telephone is held by a mechanical bracket and is connected by means of a connector to the vehicle such that when telephoning it is possible to use a microphone accommodated in the interior of the vehicle and the loudspeakers of the vehicle. In addition, there are designs for detachable navigation appliances in the vehicle that can be used to flexibly add on navigation functions.

The coupling of appliances that are brought along in the vehicle is not limited to communication solutions and driver assistance systems, however. In addition, various solutions have been indicated for coupling reproduction appliances from consumer electronics to the vehicle devices too.

For example EP 1 809 511 B1 describes a housing for securely holding a detachably connected electronic player in a vehicle seat, which player can be connected to the vehicle both for the purpose of data interchange and electrically by the mechanical connection, e.g. by appropriate pins and connectors in the bracket. In this case, it is also possible for audio and video data stored in the detachably connected player to be output at other positions in the vehicle via the vehicle loudspeakers and screens.

DE 10 2005 038 969 A1 describes an entertainment system with a media center and a portable display appliance. In this case, a detachable mounting design for the portable display appliance in the head rest of a vehicle is described. The transmission from the media center to the display appliance for the purpose of data interchange can take place by radio, particularly by WLAN (Wireless Local Area Network).

EP 2 098 137 A1 describes a retaining apparatus in order to hold a computer in a vehicle typically on a partition in the vehicle, particularly the back rests of the front seats.

EP 0 807 878 A1 describes a docking station for a portable computer for use in a vehicle. In this case, the computer is positioned such that it can easily be controlled and does not interfere with other vehicle devices (e.g. with the airbag). In addition, stable ambient conditions are provided, e.g. by means of a heating apparatus for heating when starting during cold outside temperatures.

DE 10 2005 058 113 B4 describes a DVD player (DVD=Digital Versatile Disk) for a motor vehicle in which the player and the monitor are present in a housing as an integral appliance and can be held in or inserted into a holding housing.

US 2010/0124005 A1 describes a housing for a display appliance in a vehicle in which the appliance can be rotated into a desired position/direction. In this case, the display quality can be optimized on the basis of the situation-specific display or viewing angle.

LIST OF REFERENCE SYMBOLS

1 Vehicle
2 Driver's seat
3 Combination display with round instruments
4 Multifunction display
5 Pushbutton switch for the multifunction display
6 Rotary switch
7 Tablet PC
8 Radio interface
9 Control unit
10 Bracket
11 Touch pad for rear seats
12 Data bus in the vehicle
13 Operating parameter sensors
14a,b Display content on multifunction display
15a-l Display contents on tablet PC

The invention claimed is:
1. A method for providing a user interface in a vehicle, comprising:

capturing at the vehicle operating parameters that are relevant to the operation of the vehicle;

permanently arranging in the vehicle a display and operator control device readable from the seat position of a driver and used to display information about captured operating parameters;

setting up a wireless data link between the vehicle and a mobile reproduction appliance that is detachably connected in the vehicle or that is freely held by a user in the vehicle;

transmitting data for producing a display content from the vehicle to the reproduction appliance via the wireless data link;

using the transmitted data as a basis for producing a display content on the reproduction appliance, the display content comprising information about captured operating parameters that is displayed on the display and operator control device; and selecting a subregion of the display content on the reproduction appliance and altering the display on the reproduction appliance by highlighting or enlarging the selected subregion of the display content on the reproduction appliance;

wherein an operator control element is reproduced on the reproduction appliance and is used to control a vehicle function, wherein the operator control of an operator control element that is reproduced on the reproduction appliance transmits an announcement to the driver of the vehicle, the announcement comprising a notification that a vehicle occupant has preselected a function that requires driver confirmation prior to execution.

2. The method of claim 1, wherein at least some operator control elements controlled from the seat position of the driver and function displays readable from the seat position of the driver are reproduced on the reproduction appliance in a single display, wherein mechanical analog function displays and mechanical operator control elements are presented by symbols.

3. The method of claim 1, wherein the operator control of an operator control element that is reproduced on the reproduction appliance alters the display content of the display and operator control device.

4. The method of claim 1, wherein using the transmitted data as a basis for producing a display content on the reproduction appliance comprises displaying a virtual cockpit and a subregion is selected from the displayed virtual cockpit.

5. A system for providing a user interface in a vehicle, comprising:

a capture device that is permanently arranged in the vehicle and used to capture operating parameters that are relevant to the operation of the vehicle at the vehicle;

a display and operator control device that is arranged permanently in the vehicle-so as to be read from the seat position of the driver and used to display information;

a mobile reproduction appliance that is connected detachably to the vehicle or that is freely held in the vehicle;

a wireless data interface between the reproduction appliance and the vehicle used to transmit data for producing a display content from the vehicle to the reproduction appliance; and a control unit that is connected to the capture device, the display and operator control device and the data interface, wherein the control unit produces a display content on the reproduction appliance based on the transmitted data, which display content comprises information about captured operating parameters that is displayed on the display and operator control device; wherein the display content includes functions controlled freely by an occupant of the vehicle other than a driver, functions preselected by the occupant of the vehicle and require confirmation from the driver prior to execution of the functions; and functions for which the operator control is reserved for the driver.

6. The system of claim 5, wherein the reproduction appliance is mounted detachably in the vehicle, as a result of which the display content is reproduced at a position in the vehicle that cannot be viewed from the seat position of the driver.

7. The system of claim 5, wherein the reproduction appliance is mounted detachably in the vehicle and the reproduction appliance is controlled using an operator control element associated with the vehicle.

8. The system of claim 7, wherein the reproduction appliance is mounted detachably in the vehicle, and the reproduction appliance is controlled using a touch-sensitive operator control panel that is associated with the vehicle.

9. The system of claim 7, wherein the reproduction appliance is mounted detachably in the vehicle at a position that is associated with a particular seat position, and the reproduction appliance is controlled using an operator control element that is associated with said seat position and is installed permanently in the vehicle.

10. The system of claim 7, wherein a subregion of the display content that the information displayed on the display and operator control device comprises is controlled via selection on the reproduction appliance such that the selected subregion of the display content is presented in highlighted form or enlarged form.

11. The system of claim 7, wherein the at least some of the operator control elements controlled from the seat position of the driver or function displays readable from the seat position of the driver are reproduced on the reproduction appliance, wherein mechanical analog function displays and mechanical operator control elements are presented by symbols.

12. The system of claim 11, wherein an operator control element that is reproduced on the reproduction appliance controls a vehicle function.

13. The system of claim 12, wherein the operator control of an operator control element that is reproduced on the reproduction appliance alters the display content of the display and operator control device.

14. The system of claim 12, wherein the operator control of an operator control element that is reproduced on the reproduction appliance transmits an announcement to the driver of the vehicle.

15. The system of claim 5, wherein the display and operator control device display information about captured operating parameters.

16. The system of claim 5, wherein the reproduction appliance is controlled using a touch-sensitive operator control panel.

* * * * *